United States Patent [19]

Kobayashi

[11] Patent Number: 4,754,145
[45] Date of Patent: Jun. 28, 1988

[54] RADIATION IMAGE ERASE UNIT FOR USE WITH STIMULABLE PHOSPHOR SHEET

[75] Inventor: Masaaki Kobayashi, Kanagawa, Japan

[73] Assignee: Fuji Photo Film Co., Ltd., Kanagawa, Japan

[21] Appl. No.: 853,290

[22] Filed: Apr. 17, 1986

[30] Foreign Application Priority Data

Apr. 18, 1985 [JP] Japan .................................. 60-84033

[51] Int. Cl.⁴ ............................................. G01T 1/10
[52] U.S. Cl. ............................... 250/484.1; 250/327.2
[58] Field of Search ............... 250/327.2, 484.1, 455.1, 250/454.1, 453.1, 354.1; 315/158

[56] References Cited

U.S. PATENT DOCUMENTS

| | | | |
|---|---|---|---|
| 3,433,949 | 3/1969 | Truhan | 250/504 R |
| 3,679,903 | 7/1972 | Blitchington, Jr. | 250/354.1 |
| 4,258,264 | 3/1981 | Kotera et al. | 250/484.1 |
| 4,276,473 | 6/1981 | Kato et al. | 250/327.2 |
| 4,315,318 | 2/1982 | Kato et al. | 364/515 |
| 4,387,428 | 6/1983 | Ishida et al. | 364/414 |
| 4,400,619 | 8/1983 | Kotera et al. | 250/327.2 |
| 4,496,838 | 1/1985 | Umemoto et al. | 250/327.2 |
| 4,533,853 | 8/1985 | Hammond et al. | 315/117 |
| 4,584,482 | 4/1986 | Suzuki et al. | 250/459.1 |

FOREIGN PATENT DOCUMENTS 11395 2/1979 Japan .................................. 250/327.2

Primary Examiner—Janice A. Howell
Assistant Examiner—Constantine Hannaher
Attorney, Agent, or Firm—Sughrue, Mion, Zinn, Macpeak and Seas

[57] ABSTRACT

A radiation image erase unit erases a remaining radiation image from a stimulable phosphor sheet by exposing the same to erasure light after reading out a radiation image stored thereon by applying stimulating light to the stimulable phosphor sheet to cause the same to emit light representative of the radiation image and detecting and converting the light emitted from the stimulable phosphor sheet photoelectrically to an electric signal. When the illuminance of the erasure light emitted from erasing light sources is lowered, or one or more of the erasing light sources fail to be energized, the stimulable phosphor sheet is controlled to remain in the radiation image erase unit during a time dependent on the reduction in the illuminance of the erasure light. Any remaining radiation image is thus completely erased from the stimulable phosphor sheet in preparation for the recording of a next radiation image thereon.

4 Claims, 7 Drawing Sheets

RADIATION IMAGE ERASE UNIT FOR USE WITH STIMULABLE PHOSPHOR SHEET

BACKGROUND OF THE INVENTION

The present invention relates to a radiation image erase unit for erasing a remaining radiation image from a stimulable phosphor sheet by exposing the stimulable phosphor sheet to erasure light after light representing a stored radiation image has been emitted from the stimulable phosphor sheet by applying stimulating light thereto, and more particularly to such a radiation image erase unit capable of sufficiently erasing a remaining radiation image even when the erasure light is varied such as upon failure of erase light sources.

There has in recent years been proposed a radiation image recording and reproducing system in which a radiation image of an object can be produced by using a stimulable phosphor. The stimulable phosphor is a phosphor which, when exposed to a radiation such as X-rays, α-rays, β-rays, γ-rays, cathode rays, or ultraviolet rays, stores a part of the energy of the radiation. When the stimulable phosphor exposed to the radiation is subsequently exposed to stimulating light such as visible light, the stimulable phosphor emits light in proportion to the stored energy of the radiation.

The radiation image recording and reproducing system employs such a stimulable phosphor. More specifically, the radiation image of an object such as a human body is stored in a sheet having a layer of stimulable phosphor (hereinafter referred to as a "stimulable phosphor sheet"), and then the stimulable phosphor sheet is scanned with stimulating light such as a laser beam to cause the stimulable phosphor sheet to emit light representative of the radiation image. The emitted light is then photoelectrically detected and converted to an electric image signal which is processed to reproduce a visible image on a recording medium such as a photographic film material or on a display unit such as a cathode-ray tube (CRT).

The aforesaid radiation image recording and reproducing system is disclosed in U.S. Pat. Nos. 4,258,264, 4,276,473, 4,315,318, 4,387,428, and Japanese Laid-Open Patent Publication. No. 56-11395, for example.

The radiation image recording and reproducing system of the type described above is of greater practical advantage than conventional radiographic systems using a combination of an intensifying screen and an X-ray film in that images can be recorded in a wide range of radiation exposure. More specifically, it is known that the amount of light emitted from a stimulable phosphor upon stimulation thereof is proportional in a highly wide range to the amount of radiation to which the stimulable phosphor has been exposed. Therefore, even if the amount of radiation to which the stimulable phosphor is exposed varies widely under various conditions, radiation images free from such exposure variations can be obtained by selecting a suitable read-out gain in the photoelectric conversion means for detecting and converting the emitted light into an electric signal, and processing the electric signal into a visible image on a recording medium such as photosensitive material or on a display unit such as a CRT.

The radiation image recording and reproducing system is capable of processing a converted electric signal to produce a visible image on a recording medium or a display unit so that the radiation image can well be observed for diagnostic purpose. In this system, the stimulable phosphor sheet does not serve as a final image recording medium, but as a temporary image storage medium for eventually transferring images to the final recording medium or display unit. Therefore, the stimulable phosphor sheet can be used repeatedly or recyclically, and is economical and convenient if in repetitive use.

To reuse the stimulable phosphor sheet, the remaining radiation energy on the stimulable phosphor sheet after the radiation image has been read out by stimulating light is discharged by exposure to light, and the stimulable phosphor sheet is employed again for recording a radiation image thereon. The erasure of the radiation energy from the stimulable phosphor sheet is disclosed in U.S. Pat. No. 4,400,619, for example.

An image erase mechanism for removing the remaining radiation image from the stimulable phosphor sheet has erase light sources capable of emitting erasure light of as great illuminance as possible in order to cause almost all remaining radiation energy to be emitted from the stimulable phosphor sheet.

The erase light sources generally comprise a plurality of discharge lamps that are normally kept energized in an erase unit, i.e., in its casing. Therefore, while they are in use for a long period of time, the illuminance of light emitted therefrom is lowered or the discharge lamps fail to emit light because of their limited service life or the like. When this happens, the remaining image on the stimulable phosphor sheet cannot be erased completely, and the stimulable phosphor sheet cannot be used recyclically. If the stimulable phosphor sheet with a remaining image thereon is used again, a new object image will be recorded on the stimulable phosphor sheet in overlapping relation to the remaining image, and hence no accurate object image can be reproduced from the stimulable phosphor sheet. Since the erase light sources are housed in the erase unit, and the erase unit and an image read-out mechanism are mounted in an apparatus housing, it is impossible to check the erase light sources for their proper energization from the exterior of the housing.

SUMMARY OF THE INVENTION

It is a general object of the present invention to provide a radiation image erase unit for use with stimulable phosphor sheets, which, when one or some of the erase light sources fail to operate or the overall illuminance of erasure light emitted therefrom is lowered, can control the stimulable phosphor sheet to remain exposed to erasure light emitted from the remaining erase light sources for a longer period of time, so that the remaining image can substantially entirely be erased from the stimulable phosphor sheet in preparation for the recording of a new radiation image thereon.

Another object of the present invention is to provide a radiation image erase unit for erasing a remaining radiation image from a stimulable phosphor sheet by exposing the same to erasure light after reading out a radiation image stored thereon by applying stimulating light to the stimulable phosphor sheet to cause the same to emit light representative of the radiation image and detecting and converting the light emitted from the stimulable phosphor sheet photoelectrically to an electric signal, the radiation image erase unit comprising: detecting means for substantially detecting a reduction in the illuminance of the erasure light; time-setting means for setting a time corresponding to the reduction in the illuminance detected by the detecting means; and control means for keeping the stimulable phosphor sheet in the radiation image erase unit during the time set by the time-setting means.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 1:
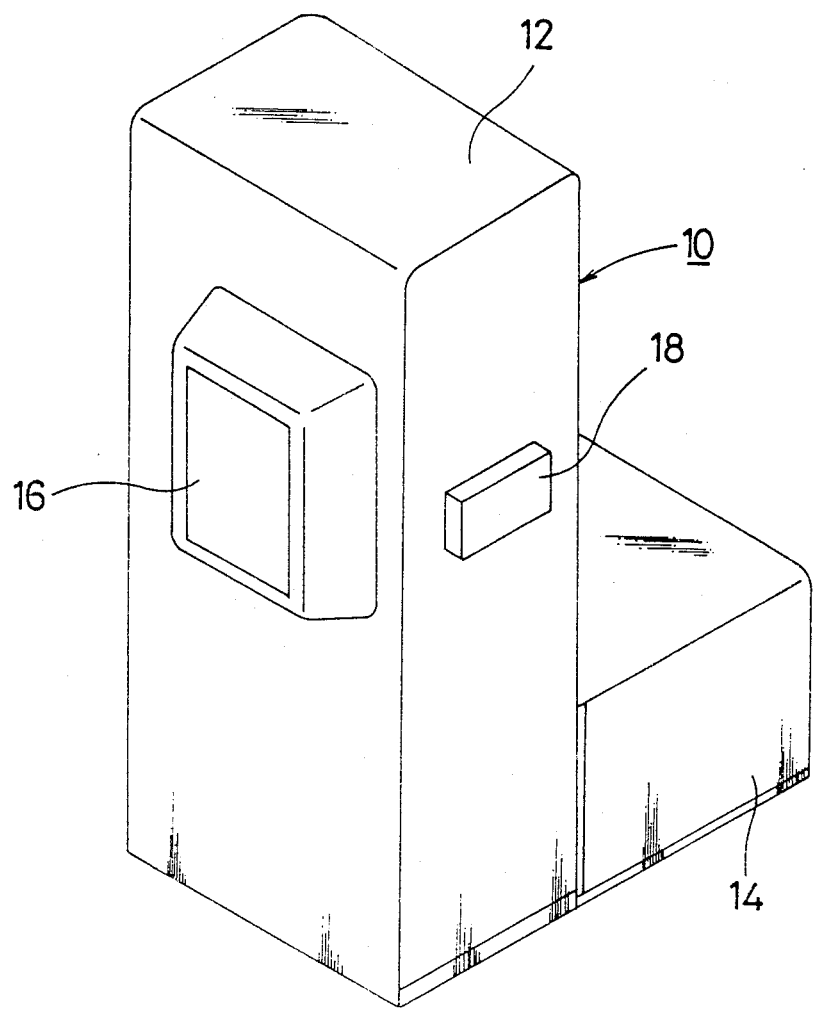
FIG. 1 is a perspective view of a radiation image recording and read-out apparatus.

As shown in FIG. 1, an upstanding radiation image recording and read-out apparatus 10 includes a first vertical housing 12 and a second horizontal housing 14. The first housing 12 supports an exposure unit (radiation image recording unit) 16 on a front upper portion thereof and a control unit 18 on a side upper wall thereof.

Figure 2:
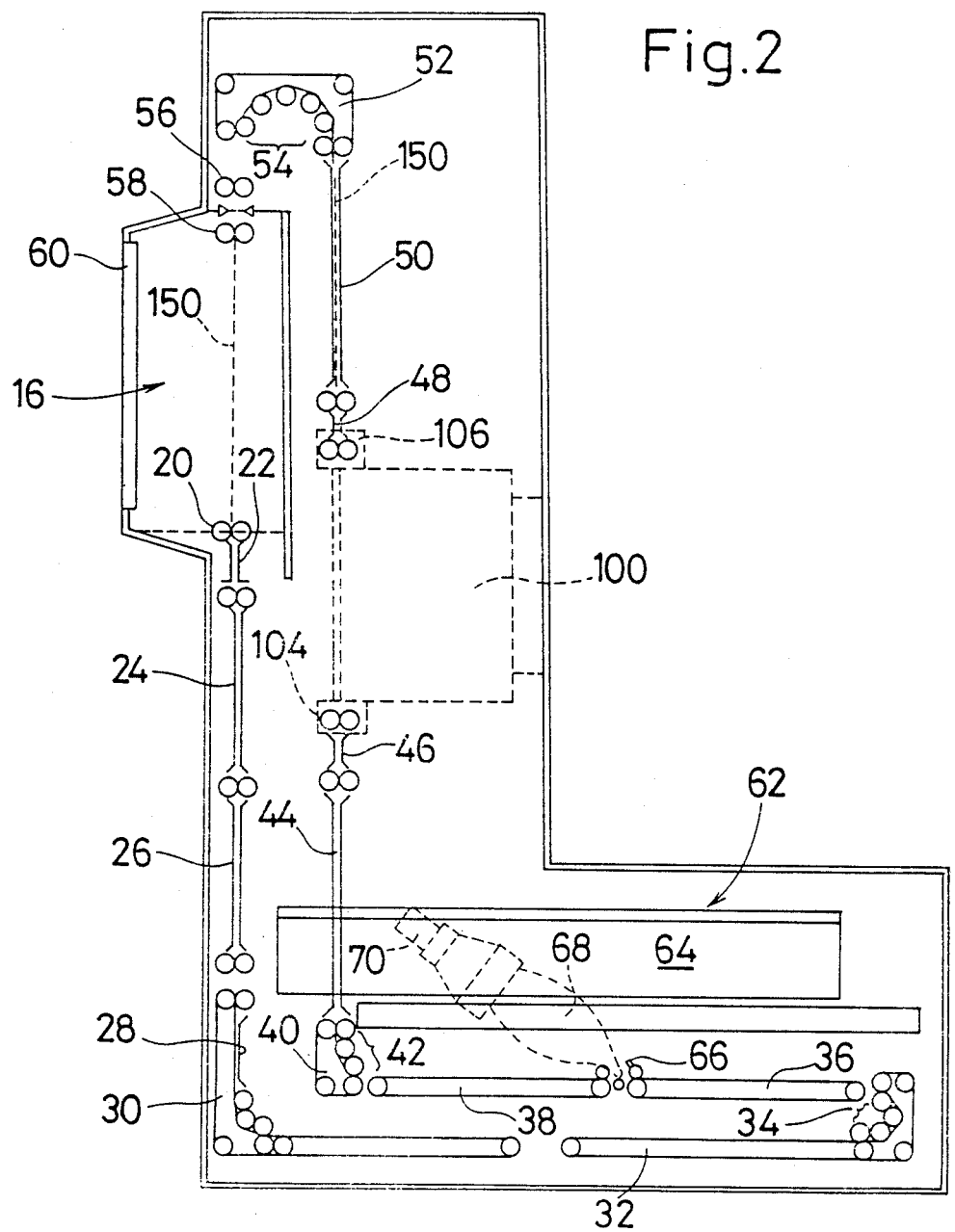
FIG. 2 is a vertical cross-sectional view of the radiation image recording and read-out apparatus of FIG. 1.

The arrangements in the first and second housings 12, 14 will be described with reference to FIG. 2.

A pair of sheet reception rollers 20 for receiving a stimulable phosphor sheet on which an image is recorded is disposed in a lower portion of the image recording unit 16. Below the roller pair 20, there are disposed a pair of first guide members 22 and a pair of second guide members 24 extending in the vertical direction in alignment with the first guide members 22. A pair of third guide members 26 and a fourth guide member 28 are located beneath the first and second guide members 22, 24 with a roller pair disposed therebetween, there being also roller pairs between the third and fourth guide members 26, 28. A first endless feed belt 30 is disposed closely to the fourth guide member 28 and has an angularly bent configuration at an inner corner of the first housing 12, the bent configuration of the first endless feed belt 30 being kept by a roller group below the fourth guide member 28. The first feed belt 30 terminates at a lower central portion of the second housing 14. A second endless feed belt 32 is disposed in a slightly spaced relation to the terminal end of the first endless feed belt 30. The second endless feed belt 32 is angularly bent in an upward direction at an inner corner of the second housing 14. A group of rollers 34 is held against the inner bent portion of the second feed belt 32. A pair of third and fourth endless feed belts 36, 38 extend horizontally in slightly spaced relation to the terminal end of the feed belt 32. A fifth endless feed belt 40 bent upwardly is located in the vicinity of the terminal end of the fourth feed belt 38. A group of rollers 42 is held against a surface of the belt 40. The fifth feed belt 40 and the roller group 42 are located beneath a pair of guide members 44 disposed below a pair of guide members 46 with a pair of rollers interposed therebetween. Above the guide members 46, there is positioned a radiation image erase unit 100 (described later on) according to the present invention.

Relatively short guide members 48 are disposed above the radiation image erase unit, and other guide members 50 are located above the guide members 48. An endless feed belt 52 of a bent configuration is disposed in the vicinity of the terminal ends of the guide members 50 in a substantially top portion of the first housing 12 as can be understood from FIG. 2. A roller group 54 is held against an inner run of the feed belt 52. Below the terminal ends of the feed belt 52 and the roller group 54, there are disposed two pairs of rollers 56, 58 for supplying a stimulable phosphor sheet into the image recording unit 16.

The feed system for a stimulable phosphor sheet has the above basic construction in the radiation image recording and read-out apparatus 10.

The image read-out unit disposed in the radiation image recording and read-out apparatus 10 in association with the feed system will be described.

The image read-out unit, designated 62, is basically composed of a laser beam source 64, a scanning optical system including a galvanometer mirror (not shown) for scanning a stimulable phosphor sheet with a laser beam emitted from the laser beam source 64, a reflecting mirror 66 for collecting light, and a light guide 68 for effectively collecting and guiding light emitted from the stimulable phosphor sheet by the scanning laser beam applied thereto. A photomultiplier 70 is mounted on the top of the light guide 68 to detect the emitted light and to convert it to an electric signal.

Figure 3:
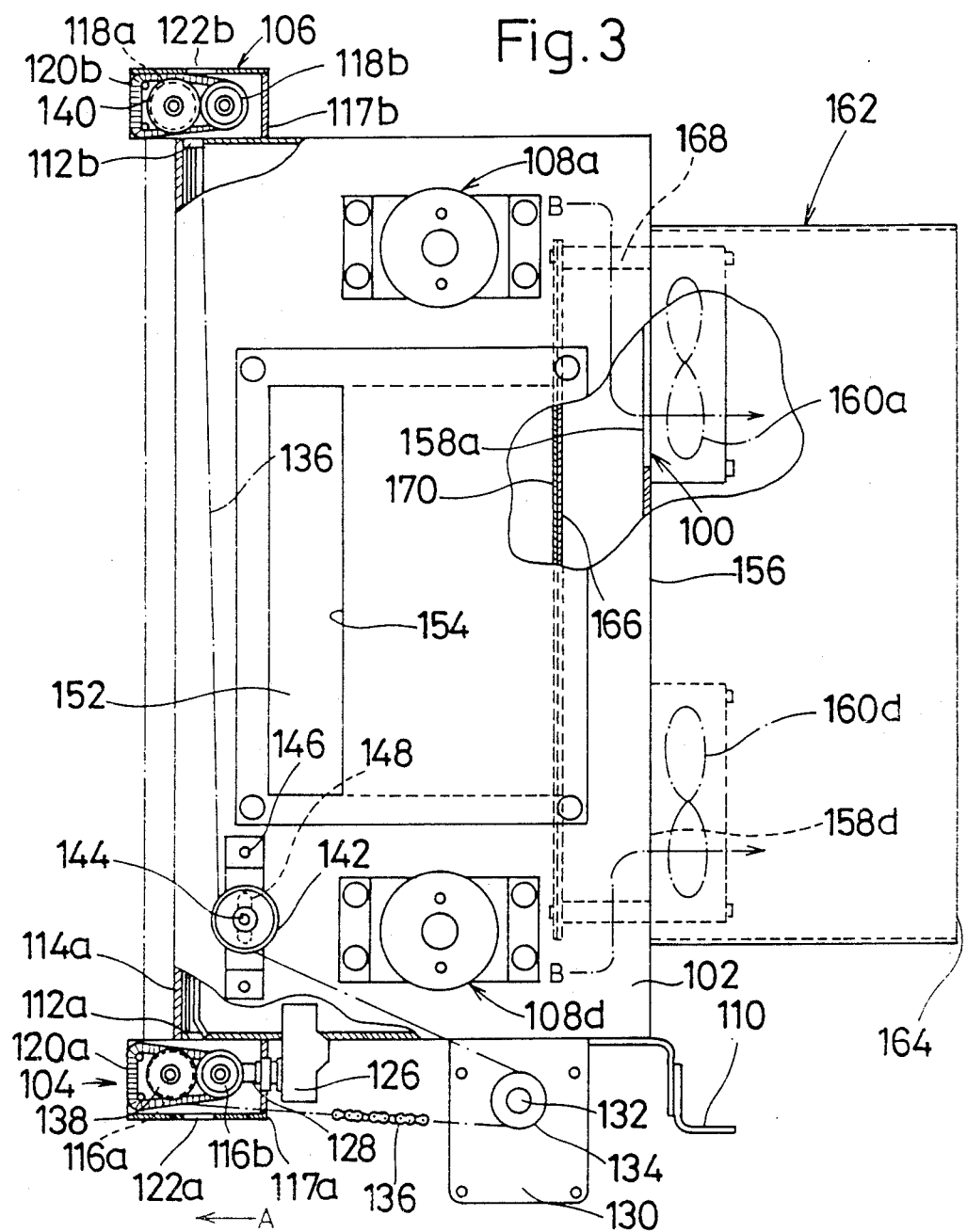
FIG. 3 is a vertical cross-sectional view of a radiation image erase unit for use with stimulable phosphor sheets according to an embodiment of the present invention.
Figure 4:
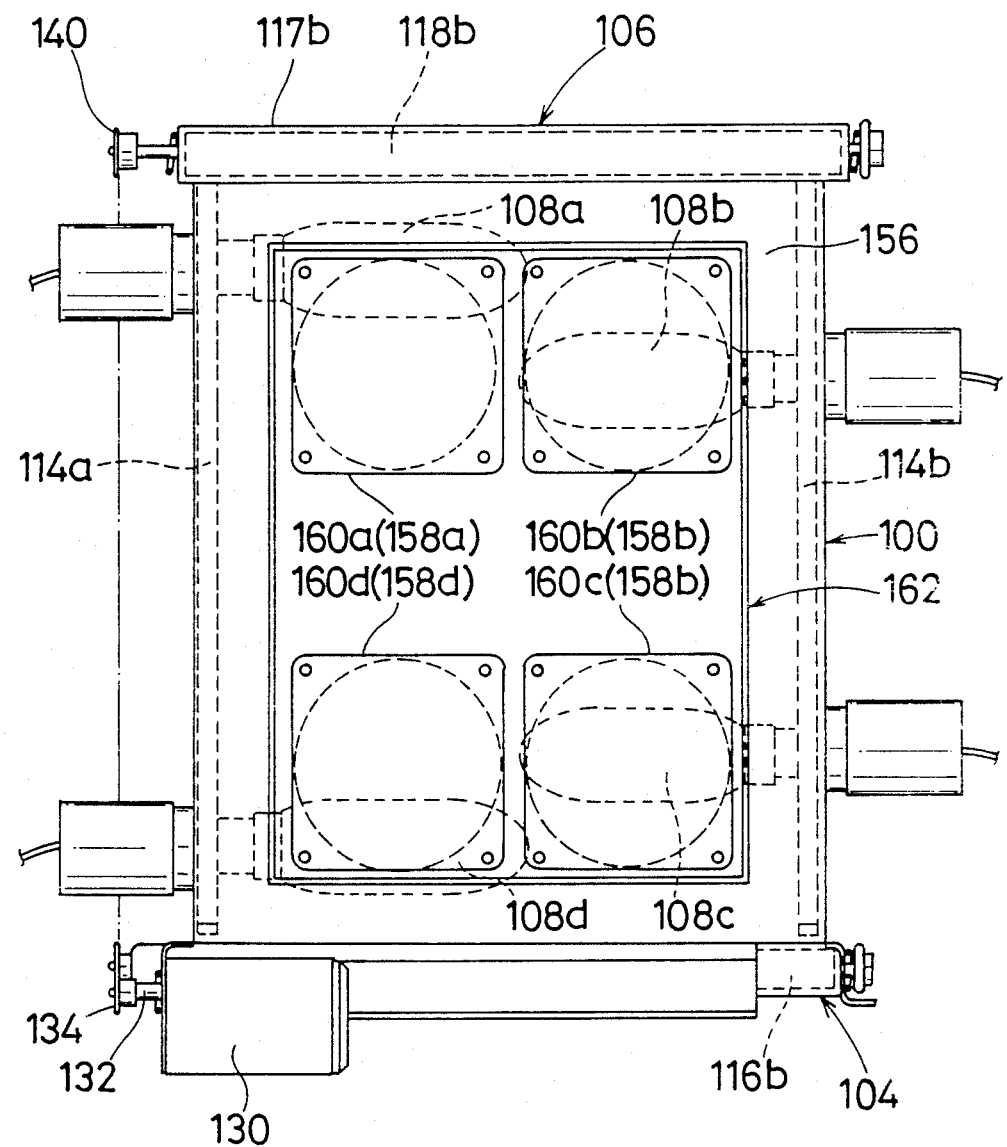
FIG. 4 is a side elevational view of the radiation image erase unit of FIG. 3.
Figure 5:
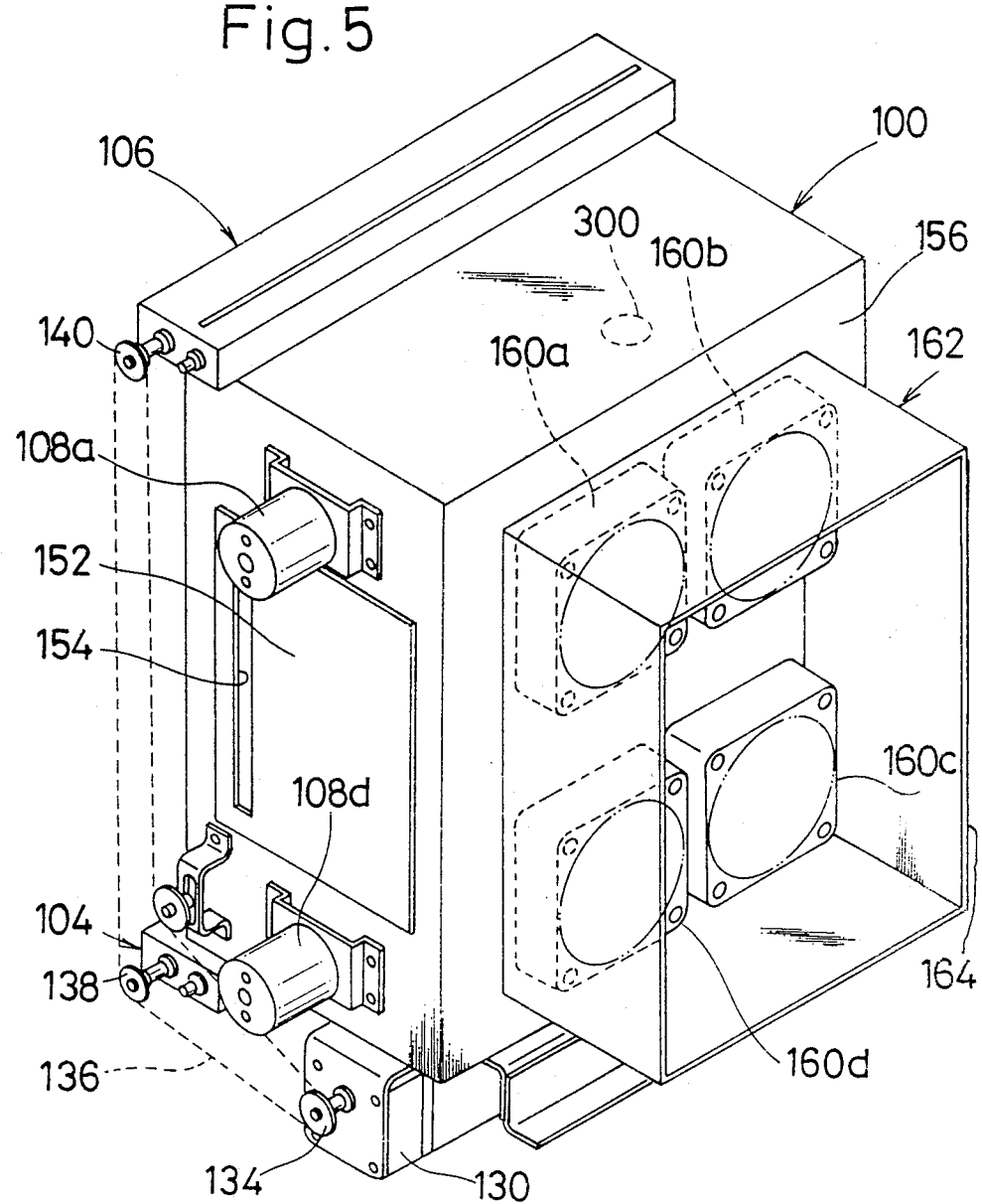
FIG. 5 is a perspective view of the radiation image erase unit of FIG. 3.

The radiation image erase unit according to the present invention is shown FIGS. 3 through 5.

The reference numeral 100 in FIG. 3 generally denotes the radiation image erase unit for stimulable phosphor sheets. The radiation image erase unit 100 essentially comprises a casing 102, a pair of feeders 104, 106 mounted on the lower and upper ends, respectively, of the casing 102, and four light sources 108a through 108d such as discharge lamps for emitting erasure light into the casing 102. The inner wall surface of the casing 102 is of a mirror finish, or a reflecting thin film or plate is attached to the inner wall surface of the casing 102, for effectively reflecting the erasure light from the light sources 108a through 108d. An angle 110 is fixed to the lower end of the casing 102. The casing 102 can be fixed to the first housing 12 by attaching the angle 110 to the first housing 12.

The casing 102 has inlet and outlet slots 112a, 112b defined in upper and lower panels thereof adjacent to the feeders 104, 106, respectively. Guide members 114a, 114b disposed in the casing 102 extend parallel to each other between the inlet and outlet slots 112a, 112b, as shown in FIG. 4, for guiding a stimulable phosphor sheet from the inlet slot 112a to the outlet slot 112b.

The feeder 104 is composed of a pair of nip rollers 116a, 116b held in rolling contact with each other and enclosed in a first box-shaped cover 117a outwardly of the slot 112a. Likewise, the feeder 106 is composed of a pair of nip rollers 118a, 118b held in rolling contact with each other and enclosed in a second box-shaped cover 117b at the slot 112b. Resilient members 120a, 120b such as coil springs are attached to the covers 117a, 117b, respectively, and held in engagement with the nip rollers 116b, 118b for normally urging them to be forcibly pressed against the nip rollers 116a, 118a, respectively. The covers 117a, 117b. which surround the respective feeders 104, 106 thus constructed have slots 122a, 122b, respectively, aligned with the inlet and outlet slots 112a, 112b, respectively.

A detecting arm 128 of a microswitch 126 is disposed in contact with the nip roller 116b. A motor 130 is fixed to the casing 102 closely to the angle 110 and has a rotatable shaft 132 to which a first sprocket 134 is fixed. A chain 136 is trained around the first sprocket 134, a second sprocket 138 fixed coaxially to the nip roller 116a, and a third sprocket 140 disposed in an upper position and fixed coaxially to the nip roller 118a. The chain 136 is also trained around a fourth tensioning sprocket 142 mounted on the side panel of the casing 102.

The fourth sprocket 142 is supported on a shaft 144 displaceable in a slot 148 defined in a holder 146 attached to the casing 102 for giving the chain 136 an optimum tension.

The radiation image erase unit 100 includes a heat radiator for forcibly cooling the casing 102. As shown in FIG. 5, the heat radiator is composed of a relatively small opening 154 defined in a front wall 152 of the casing 102 and extending vertically as a narrow slot, a plurality of openings 158a through 158d (four openings in the illustrated embodiment) defined in a side panel 156 of the casing 102 and each larger than the opening 154, and a plurality of motor-driven fans 160a through 160d (four motor-driven fans in the illustrated embodiment) disposed respectively in the openings 158a through 158d and drivable in synchronism with energization of the light sources 108a through 108d. A duct 162 of a rectangular cross section is mounted on the side panel 156 in surrounding relation to the openings 158a through 158d and hence the motor-driven fans 160a through 160d. The duct 162 has an opening 164 at its distal end extending through the first housing 12, the opening 164 communicating with the exterior of the radiation image recording and read-out apparatus 10 (FIGS. 1 and 2).

A reflecting plate 166 smaller in area than the side panel 156 is disposed in the casing 102 and mounted on the side panel 156 by bolts 168 threaded at both ends thereof or other fasteners, the reflecting plate 166 being spaced from the inner surface of the side panel 156. The reflecting plate 166 is positioned as closely to the light sources 108a through 108d as possible, and has a surface 170 of a mirror finish which faces the light surfaces 108a through 108d. Alternatively, the surface of the reflecting plate 166 facing the light sources 108a through 108d may be coated with a thin reflecting film or provided with a thin reflecting plate.

A suitable photoelectric detector may be disposed in the casing 102 close to the feeder 106 for detecting the insertion of a stimulable phosphor sheet into the casing 102, so that one or more of the light sources which have failed to be energized can smoothly be controlled for energization, as described later on.

Figure 6:
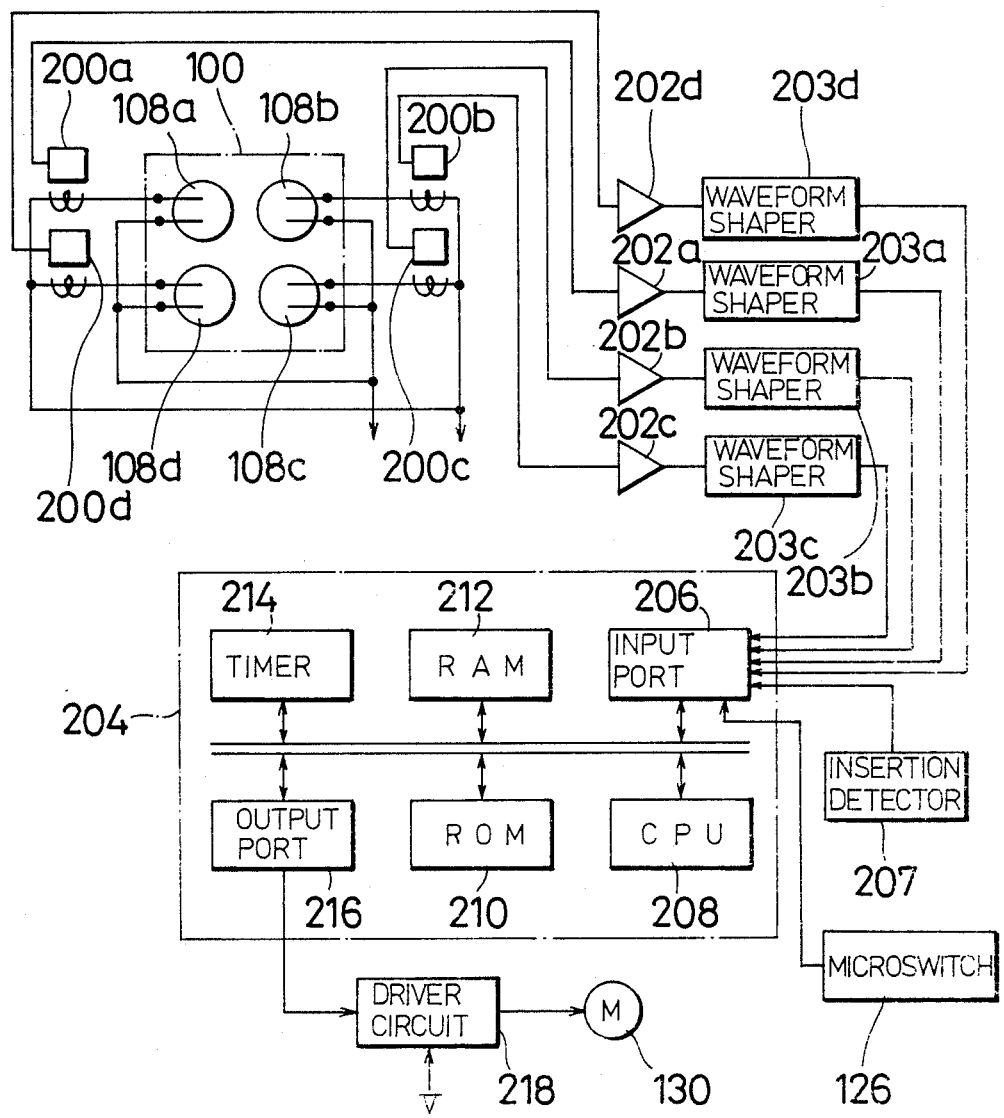
FIG. 6 is a block diagram of a control system for the radiation image erase unit of the invention.

A control system for controlling the erasing light sources 108a through 108d in the radiation image erasing unit 100 will be described below with reference to FIG. 6.

A system for supplying an electric current to the erasing light sources 108a through 108d is associated with current sensors 200a through 200d having output terminals connected respectively to amplifiers 202a through 202d that are coupled via respective waveform shapers 203a through 203d to a control unit 204. The control unit 204 is essentially in the form of a microcomputer and has an input port 206 connected to the output terminals of the waveform shapers 203a through 203d. The input port 206 of the control unit 204 is also supplied with an output signal from a photoelectric detector 207 disposed in the casing 102 for detecting the insertion of a stimulable phosphor sheet into the casing 102.

The control unit 204 also includes a CPU (central processing unit) 208, a ROM (read-only memory) 210 storing a program for controlling operation of the control unit 204, a RAM (random-access memory) 212 for storing data, a timer 214, and an output port 216 connected to a driver circuit 218 for driving the motor 130.

Operation and advantages of the radiation image erase unit thus constructed will be described below.

An object (not shown) held against an exposure surface 60 of the image recording unit 16 is exposed to a radiation, and a radiation image of the object is recorded on a stimulable phosphor sheet 150. The stimulable phosphor sheet 150 is then fed through the rollers 20, the guide members 24, 26, and the feed belts 30, 32, 36 to the image read-out unit 62. In the image read-out unit 62, the stimulable phosphor sheet 150 is scanned by a laser beam emitted from the laser source 64 to emit light which is reflected directly or by the mirror 66 to the light guide 68. The light from the light guide 68 is then detected and photoelectrically converted by the photomultiplier 70 to an electric signal that is fed to an image reproducing unit (not shown).

After the radiation image has been read from the stimulable phosphor sheet 150, the stimulable phosphor sheet 150 is fed by the feed belts 38, 40 through the guide members 44 and the guide members 46 to the nip rollers 116a, 116b. The stimulable phosphor sheet 150 as introduced into the inlet slot 122a is led by the nip rollers 116a, 116b into the casing 102. When the stimulable phosphor sheet 150 is pinched between the nip rollers 116a, 116b, the nip roller 116b is displaced by the stimulable phosphor sheet 150 away from the nip roller 116a against the tension of the coil spring 120a, thereby pushing the detecting arm 128 of the microswitch 126. The microswitch 126 then generates a signal to energize the motor 130, whereupon the chain 136 is moved to rotate the second sprocket 138. Since the second sprocket 138 is fixed coaxially to the nip roller 116a, the nip roller 116a is rotated by the second sprocket 138 to deliver the stimulable phosphor sheet 150 upwardly. Thus, as described above, the microswitch 126 is turned on to produce an electric signal to energize the motor 130 when the stimulable phosphor sheet 150 reaches the nip roller 116b and displaces the same.

While the stimulable phosphor sheet 150 is being introduced through the inlet slot 112a into the casing 102 by being gripped between the nip rollers 116a, , 116bz the light sources 108a, 108b, 108c, and 108d are energized to emit light at all times, and air heated by the light sources 108a through 108d in the casing 102 is discharged out of the casing 102 by the motor-driven fans 160a through 160d. The inner surface of the casing 102, which confronts the light sources 108a through 108d, is exposed to the light sources 108a through 108d, until the stimulable phosphor sheet 150 is fully introduced into the casing 102. When the stimulable phosphor sheet 150 is fully placed in the casing 102, erasure light emitted from the light sources 108a through 108d is sufficiently reflected within the casing 102 and applied to the stimulable phosphor sheet 150. As a consequence, a remaining radiation image on the stimulable phosphor sheet 150 can substantially completely be erased by the erasure light in the casing 102.

Operation of the control unit 204 upon failure of the light sources 108a through 108d will hereinafter be described.

Currents flowing through the light sources 108a through 108d are detected respectively by the current sensors 200a through 200d. Output signals produced by the current sensors 200a through 200d are amplified by the respective amplifiers 202a through 202d, and the waveforms of the amplified signals are shaped by the waveform shapers 203a through 203d, respectively. When the stimulable phosphor sheet 150 is delivered into the radiation image erase unit 100, it is photoelectrically detected by the photoelectric detector 207. More specifically, the insertion of the stimulable phosphor sheet 150 into the radiation image erase unit 100 is detected upon detection of a negative-going edge of the output signal from the photoelectric detector 207. The output signals from the waveform shapers 203a through 203d and the output signal from the photoelectric detector 207 are supplied to the input port 206. An output signal from the output port 216 is supplied to the driver circuit 218 which generates an output signal to control the rotation and stoppage of the motor 130. The CPU 208 is controlled by the program stored in the ROM 210 to read the output signals from the waveform shapers 203a through 203d and the output signal from the photoelectric detector 207, and to process these output signals for generating the output signal from the output port 216.

Figure 7:
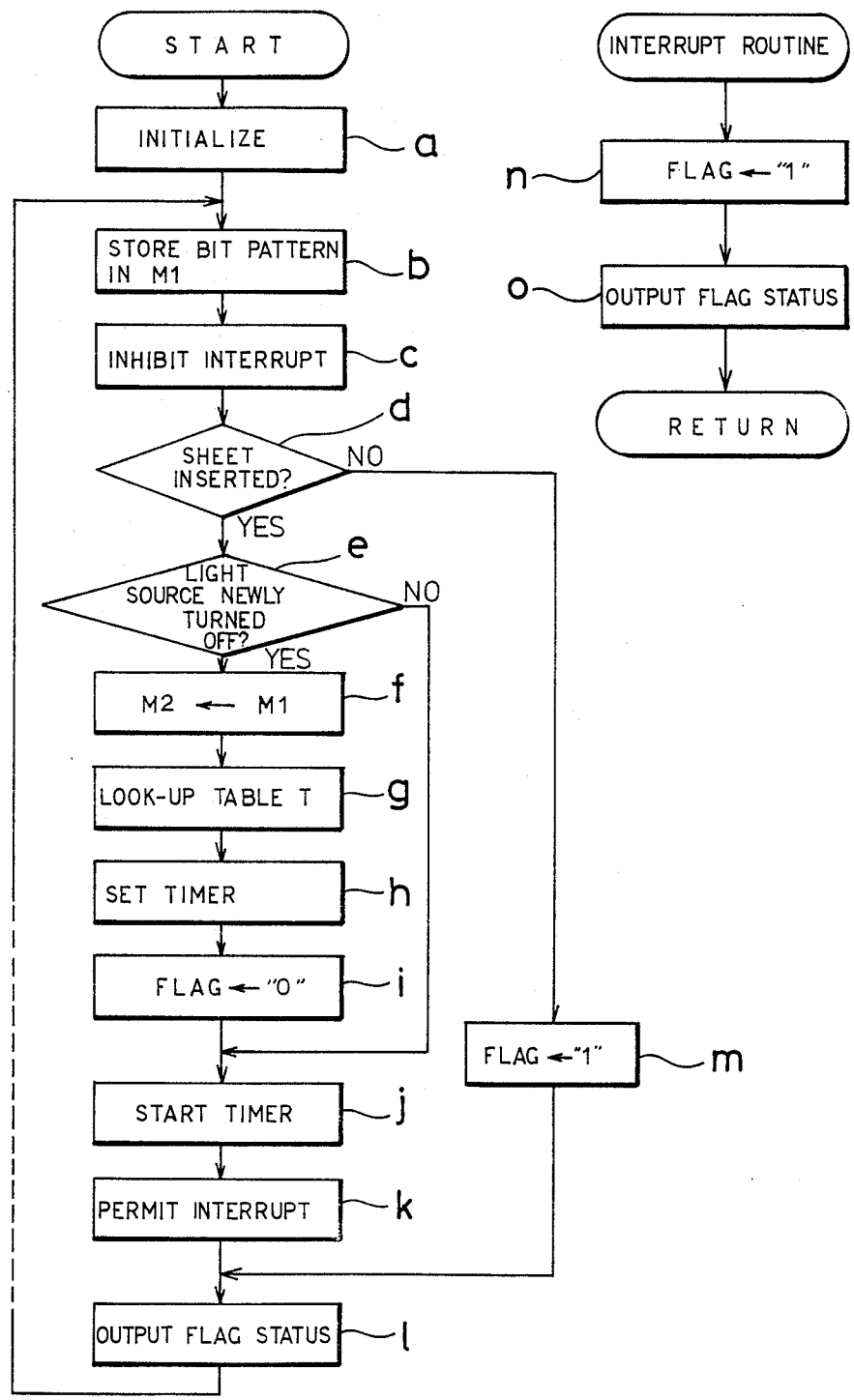
FIG. 7 is a flowchart of an operation sequence of the control system illustrated in FIG. 6.

Operation of the control system under the control of the program stored in the ROM 210 will be described with reference to FIG. 7.

The ROM 210 stores, in addition to the operation program, a table T storing data items representative of de-energization times of the motor 130 in relation to bit patterns formed by the output signals from the current sensors 200a through 200d. The RAM 212 includes memory areas M1, M2 for storing the bit patterns formed by the output signals from the current sensors 200a through 200d and a flag area M3.

When the program starts running, the control unit 204 is initialized in a step a by clearing the memory area M1 and the flag area M3, storing in the memory area M2 data indicative of a de-energization time $t_0$ of the motor 130 which is required for all of the light sources 108a through 108d to erase the remaining radiation image from the stimulable phosphor sheet, and setting a timer counter in the timer 214 to the data indicative of the de-energization time $t_0$. The step a is followed by a step b which reads the output signals of the waveform shapers 203a through 203d and the output signal of the photoelectric detector 207, and stores their bit patterns in the memory area M1. Then, an interrupt is inhibited in a step c, and insertion of the stimulable phosphor sheet 150 in the radiation image erase unit 100 is checked in a step d by checking the bit pattern of the output signal of the photoelectric detector 207 that is stored in the memory area M1.

If the stimulable phosphor sheet 150 is not inserted in the step d, i.e., if a high-voltage output signal is not generated by the photoelectric detector 207, then the program jumps from the step d to a step m in which the flag area M3 is set to "1". Thereafter, the content of the flag area M3 is outputted in a step l. Then, the step b is executed after other steps not directly related to the present invention have been executed. At this time, the content of the flag area M3 is "1". The motor 130 is driven by the driver circuit 218 to deliver the stimulable phosphor sheet 150 until it is fully inserted into the radiation image erase unit 100.

If the stimulable phosphor sheet 150 is inserted in the step d, the program proceeds from the step d to a step e which ascertains whether any of the light sources is newly turned off or not by checking if the content of the memory area M2 is the same as the content of the memory area M1. When the content of the memory area M2 is the same as the content of the memory area M1, no light source is newly turned off. When the content of the memory area M2 is not the same as the content of the memory area M1, a light source is newly turned off. If no light source is newly turned off in the step e then the program jumps from the step e to a step j to start the timer 214. Thereafter, an interrupt is permitted in a step k, followed by the execution of the step l.

If a light source is newly turned off in the step e, then the content of the memory area M1 is transferred to the memory area M2 in a step f, and a motor de-energization time corresponding to the content of the memory area M1 is read from the table T in a step g. The table T stores, in relation to the bit patterns in the memory area M2, data on the motor de-energization time $t_0$ to be fetched when all of the light sources 108a through 108d are turned on, data on a motor de-energization time $t_1$ to be fetched when any one of the light sources is turned off, data on a motor de-energization time $t_2$ to be fetched when any two of the light sources are turned off, and data on a motor de-energization time $t_3$ to be fetched when any three of the light sources are turned off. These motor de-energization times are correlated as follows: $t_0 < t_1 < t_2 < t_3$.

The program goes from the step g to a step h in which the data read from the table T is set in a counter in the timer 214, and then to a step i in which the flag area M3 is cleared. The step i is followed by the step j.

Upon starting of the timer 214 in the step j, it counts a clock signal produced by frequency-dividing a clock signal supplied to the microcomputer. When the count reaches a preset value in the timer 214, an internal interrupt is permitted to execute an interrupt routine. As the program enters the interrupt routine, the flag area M3 is set to "1" in a step n, and then a flag status is outputted in a step o, from which the program returns to the step prior to the interrupt execution.

Then, the steps d, m, l are executed to insert the stimulable phosphor sheet 150 into the radiation image erase unit 100. When no light source is newly turned off, the motor 130 is stopped for a period of time corresponding to the number of light sources that have been de-energized thus far. Upon elapse of the motor de-energization time, the motor 130 starts to be rotated in the steps e, j through l, n, o. When a light source is newly turned off, the motor 130 is stopped for a period of time corresponding to the number of all de-energized light sources. The motor 130 is thereafter rotated in the steps e through l, n, o upon elapse of the motor de-energization time.

Therefore, as the number of de-energized light sources is increased, the motor de-energization time becomes longer to keep the stimulable phosphor sheet 150 within the radiation image erase unit 100 for a longer interval of time for allowing the remaining radiation image to be completely erased.

The de-energization of the light sources is shown as being detected by checking the currents supplied to the light sources. However, the illuminance on the stimulable phosphor sheet 150 placed in the radiation image erase unit 100 may directly be detected by an illuminance sensor 300 (FIG. 5) disposed in the casing 102.

The control unit 204 may comprise logic circuits rather than a microcomputer. More specifically, the output signals from the waveform shapers 203a through 203d may be decoded by a decoder, and the preset value of a preset counter may be changed by the output signal from the decoder. The preset counter counts pulses of a constant frequency. When the count of the preset counter reaches the preset count, the motor 130 is de-energized.

With the arrangement of the present invention, when the illuminance of light emitted from erasing light sources in a radiation image erase unit is lowered, or one or more of the erasing light sources fail to be energized, the time during which a stimulable phosphor sheet stays in the radiation image erase unit is increased dependent on such a reduction in the illuminance. Therefore, a remaining radiation image on the stimulable phosphor sheet can be erased as effectively and completely as if the stimulable phosphor sheet were exposed to erasure light of a normal illuminance emitted from the erasing light sources. Accordingly, the stimulable phosphor sheet can be delivered again into an image recording unit without carrying any undesirable remaining radiation image, so that the stimulable phosphor sheet can record a new radiation image again for producing an accurate image of an object.

Although a certain preferred embodiment has been shown and described, it should be understood that many changes and modifications may be made therein without departing from the scope of the appended claims.

What is claimed is:

1. A radiation image erase unit for (100) for erasing a remaining radiation image from a stimulable phosphor sheet by exposing the sheet to erasure light after reading out a radiation image stored thereon, said radiation image erase unit comprising:

erasing light means (108) for emitting the erasing light, said erasing light means being enclosed within a casing (102);

sheet feeding means (104, 106) for feeding the sheet through the erase unit and exposing the sheet to said erasing light;

driving means (130, 132, 134, 136, 140, 142) for driving said sheet feeding means;

detecting means (200, 202, 203,) for detecting a reduction in the illuminance of said erasure light and for outputting a signal indicative of the reduction in illuminance; and a control unit (204) for maintaining said stimulable phosphor sheet in the image erase unit for a sufficient time to completely erase the remaining radiation image from the sheet, said control unit comprising means for receiving the output signal from said detecting means, and time-setting means for setting an erasing light exposure time in proportion to a detected reduction in the illuminance of said erasing light means, wherein said driving means operates to deliver the sheet completely within the erasing unit and to thereafter maintain the sheet therein for a time period in accordance with said set exposure time to achieve the complete erasure of the image.

2. A radiation image erase unit according to claim 1, wherein said erasing light means comprises a plurality of erasing light sources for emitting said erasure light, said detecting means comprising means for detecting failure of said erasing light sources.

3. A radiation image erase unit according to claim 2, wherein said detecting means comprises current sensors for substantially detecting currents supplied to erasing light sources.

4. A radiation image erase unit according to claim 1, wherein said detecting means comprises an illuminance sensor for detecting the illuminance of said erasure light.

* * * * *